(12) United States Patent
Ricci

(10) Patent No.: US 9,159,232 B2
(45) Date of Patent: Oct. 13, 2015

(54) VEHICLE CLIMATE CONTROL

(71) Applicant: Flextronics AP, LLC, Milpitas, CA (US)

(72) Inventor: Christopher P. Ricci, Saratoga, CA (US)

(73) Assignee: Flextronics AP, LLC, San Jose, CA (US)

(*) Notice: Subject to any disclaimer, the term of this patent is extended or adjusted under 35 U.S.C. 154(b) by 17 days.

(21) Appl. No.: 13/679,400

(22) Filed: Nov. 16, 2012

(65) Prior Publication Data

US 2013/0144470 A1    Jun. 6, 2013

Related U.S. Application Data

(60) Provisional application No. 61/560,509, filed on Nov. 16, 2011, provisional application No. 61/637,164, filed on Apr. 23, 2012, provisional application No. 61/646,747, filed on May 14, 2012, provisional (Continued)

(51) Int. Cl.
*G08G 1/0967* (2006.01)
*G06F 9/54* (2006.01)
(Continued)

(52) U.S. Cl.
CPC .......... *G08G 1/096791* (2013.01); *B60K 35/00* (2013.01); *B60K 37/02* (2013.01); *B60R 7/04* (2013.01); *B60R 16/037* (2013.01); *B60W 30/182* (2013.01); *G01C 21/20* (2013.01);
(Continued)

(58) Field of Classification Search
CPC .......... B60H 1/00285; B60H 1/00642; B60H 1/00735; B60H 1/00742; B60H 1/0075; B60H 1/00035; B60H 1/00064; B60H 1/00771; B60H 2001/003; B60R 25/2081

USPC ................. 165/41, 42, 202, 203, 237; 701/36
See application file for complete search history.

(56) References Cited

U.S. PATENT DOCUMENTS 4,350,970 A    9/1982 Von Tomkewitsch
5,045,016 A    9/1991 Stern et al.
(Continued)

FOREIGN PATENT DOCUMENTS

WO    WO 2011/147893    12/2011

OTHER PUBLICATIONS

International Search Report and Written Opinion for International (PCT) Patent Application No. PCT/US12/65423 mailed Apr. 26, 2013, 23 pages.

(Continued)

*Primary Examiner* — Thomas Tarcza
*Assistant Examiner* — Kevin Myhre
(74) *Attorney, Agent, or Firm* — Sheridan Ross P.C.

(57) ABSTRACT

Systems and methods of vehicle climate control are provided. Specifically, a vehicle with climate control includes a number of sensors for sensing climate control information, such as human bodily conditions, e.g., temperature or heart rate, of the human occupants of the vehicle, a processing unit, and a climate control. The processing unit uses the sensed human bodily conditions data from the sensors to activate the climate control the adjust the climate conditions for the human occupants. In another aspect of the disclosure, stress level of the human operator of a vehicle can be detected by sensing the bodily conditions of the human operator, determining the stress level of the human operator based on the sensed bodily conditions, and displaying a warning if the stress level is over a certain limit.

43 Claims, 5 Drawing Sheets

Related U.S. Application Data application No. 61/653,275, filed on May 30, 2012, provisional application No. 61/653,264, filed on May 30, 2012, provisional application No. 61/653,563, filed on May 31, 2012, provisional application No. 61/663,335, filed on Jun. 22, 2012, provisional application No. 61/672,483, filed on Jul. 17, 2012, provisional application No. 61/714,016, filed on Oct. 15, 2012, provisional application No. 61/715,699, filed on Oct. 18, 2012.

(51) Int. Cl.

| | | |
|---|---|---|
| *B60R 7/04* | (2006.01) | |
| *G08C 19/00* | (2006.01) | |
| *G06N 5/02* | (2006.01) | |
| *H04L 29/08* | (2006.01) | |
| *G08G 1/14* | (2006.01) | |
| *H04W 84/00* | (2009.01) | |
| *H04W 4/00* | (2009.01) | |
| *H04W 4/04* | (2009.01) | |
| *G06Q 40/08* | (2012.01) | |
| *G06F 17/00* | (2006.01) | |
| *G06F 17/30* | (2006.01) | |
| *G06F 3/0484* | (2013.01) | |
| *G08G 1/16* | (2006.01) | |
| *G06F 13/364* | (2006.01) | |
| *H04N 21/482* | (2011.01) | |
| *G06F 21/10* | (2013.01) | |
| *G06Q 30/02* | (2012.01) | |
| *G06F 13/14* | (2006.01) | |
| *B60R 16/037* | (2006.01) | |
| *B60W 30/182* | (2012.01) | |
| *G01C 21/20* | (2006.01) | |
| *B60K 35/00* | (2006.01) | |
| *B60K 37/02* | (2006.01) | |
| *G06F 3/01* | (2006.01) | |
| *G06F 3/0488* | (2013.01) | |
| *B60W 40/08* | (2012.01) | |
| *B60W 50/00* | (2006.01) | |

(52) U.S. Cl.
CPC ............. *G06F3/017* (2013.01); *G06F 3/0484* (2013.01); *G06F 3/0488* (2013.01); *G06F 9/54* (2013.01); *G06F 13/14* (2013.01); *G06F 13/364* (2013.01); *G06F 17/00* (2013.01); *G06F 17/30386* (2013.01); *G06F 21/10* (2013.01); *G06N 5/02* (2013.01); *G06Q 30/0265* (2013.01); *G06Q 40/08* (2013.01); *G08C 19/00* (2013.01); *G08G 1/143* (2013.01); *G08G 1/16* (2013.01); *H04L 67/02* (2013.01); *H04N 21/482* (2013.01); *H04W 4/001* (2013.01); *H04W 4/046* (2013.01); *H04W 84/005* (2013.01); *B60W 2040/0872* (2013.01); *B60W 2050/0095* (2013.01); *B60W 2540/22* (2013.01); *B60W 2540/26* (2013.01); *B60W 2540/28* (2013.01)

(56) References Cited

U.S. PATENT DOCUMENTS

| | | | |
|---|---|---|---|
| 5,371,802 A | 12/1994 | McDonald et al. | |
| 5,553,661 A | 9/1996 | Beyerlein et al. | |
| 5,619,179 A | 4/1997 | Smith | |
| 5,691,893 A | 11/1997 | Stothers | |
| 6,278,919 B1 | 8/2001 | Hwang et al. | |
| 6,289,332 B2 | 9/2001 | Menig et al. | |
| 6,310,542 B1 | 10/2001 | Gehlot | |
| 6,388,579 B1 | 5/2002 | Adcox et al. | |
| 6,454,178 B1 | 9/2002 | Fusco et al. | |
| 6,487,500 B2 | 11/2002 | Lemelson et al. | |
| 6,666,219 B2 | 12/2003 | Raches | |
| 6,668,219 B2 | 12/2003 | Hwang et al. | |
| 6,718,263 B1 | 4/2004 | Glass et al. | |
| 6,950,013 B2 | 9/2005 | Scaman et al. | |
| 7,089,099 B2 | 8/2006 | Shostak et al. | |
| 7,127,348 B2 | 10/2006 | Smitherman et al. | |
| 7,140,338 B2 | 11/2006 | Janisch | |
| 7,231,285 B2 | 6/2007 | Noguchi | |
| 7,418,346 B2 | 8/2008 | Breed et al. | |
| 7,492,283 B1 | 2/2009 | Racunas, Jr. | |
| 7,629,899 B2 | 12/2009 | Breed | |
| 7,663,502 B2 | 2/2010 | Breed | |
| 7,738,462 B2 | 6/2010 | Hwang | |
| 8,032,081 B2 | 10/2011 | Bai et al. | |
| 8,068,016 B2 | 11/2011 | Toh | |
| 8,138,950 B1 | 3/2012 | Leung | |
| 8,140,358 B1 | 3/2012 | Ling et al. | |
| 8,187,182 B2 | 5/2012 | Kahn et al. | |
| 8,311,858 B2 | 11/2012 | Everett et al. | |
| 8,671,002 B2 | 3/2014 | Stefik et al. | |
| 8,676,449 B2 | 3/2014 | De Jonk et al. | |
| 8,732,373 B2 | 5/2014 | Sirpal et al. | |
| 8,898,443 B2 | 11/2014 | Reeves et al. | |
| 2002/0008639 A1 | 1/2002 | Dee | |
| 2002/0049527 A1 | 4/2002 | Kohno et al. | |
| 2002/0103583 A1 | 8/2002 | Ohmura et al. | |
| 2002/0198632 A1 | 12/2002 | Breed et al. | |
| 2002/0198660 A1 | 12/2002 | Lutter et al. | |
| 2003/0028292 A1 | 2/2003 | Ueda | |
| 2003/0132840 A1 | 7/2003 | Bahar | |
| 2003/0200227 A1 | 10/2003 | Ressler | |
| 2003/0204290 A1* | 10/2003 | Sadler et al. | 701/1 |
| 2004/0082350 A1 | 4/2004 | Chen et al. | |
| 2004/0267410 A1 | 12/2004 | Duri et al. | |
| 2005/0024189 A1 | 2/2005 | Weber | |
| 2005/0088318 A1 | 4/2005 | Liu et al. | |
| 2005/0107954 A1 | 5/2005 | Nahla | |
| 2005/0131595 A1 | 6/2005 | Luskin et al. | |
| 2005/0143876 A1 | 6/2005 | Tanase | |
| 2006/0030981 A1 | 2/2006 | Robb et al. | |
| 2006/0142933 A1 | 6/2006 | Feng | |
| 2006/0267799 A1 | 11/2006 | Mendelson | |
| 2006/0269078 A1 | 11/2006 | Sakamoto et al. | |
| 2006/0282214 A1 | 12/2006 | Wolterman | |
| 2007/0008181 A1 | 1/2007 | Rollert et al. | |
| 2007/0014423 A1 | 1/2007 | Darbut et al. | |
| 2007/0021915 A1 | 1/2007 | Breed et al. | |
| 2007/0078596 A1 | 4/2007 | Grace | |
| 2007/0117525 A1 | 5/2007 | Osafune | |
| 2008/0059050 A1 | 3/2008 | Lin et al. | |
| 2008/0060861 A1 | 3/2008 | Baur et al. | |
| 2008/0077326 A1 | 3/2008 | Funk et al. | |
| 2008/0114675 A1 | 5/2008 | Ward | |
| 2008/0133507 A1 | 6/2008 | Alter et al. | |
| 2008/0281516 A1 | 11/2008 | Cummings | |
| 2008/0288162 A1 | 11/2008 | Theimer | |
| 2008/0291054 A1 | 11/2008 | Groft | |
| 2008/0319602 A1 | 12/2008 | McClellan et al. | |
| 2009/0143951 A1 | 6/2009 | Takahashi et al. | |
| 2009/0278806 A1 | 11/2009 | Duarte et al. | |
| 2010/0020169 A1 | 1/2010 | Jang et al. | |
| 2010/0023223 A1 | 1/2010 | Huang et al. | |
| 2010/0076646 A1 | 3/2010 | Basir et al. | |
| 2010/0089307 A1 | 4/2010 | Kenchington | |
| 2010/0106365 A1* | 4/2010 | Visconti et al. | 701/36 |
| 2010/0162319 A1 | 6/2010 | Piepenbrink et al. | |
| 2010/0191584 A1 | 7/2010 | Fraser et al. | |
| 2010/0214411 A1 | 8/2010 | Weinmann et al. | |
| 2010/0227555 A1 | 9/2010 | Zinn et al. | |
| 2010/0302067 A1 | 12/2010 | Goldman et al. | |
| 2010/0305819 A1 | 12/2010 | Pihlajamaki | |
| 2010/0318226 A1* | 12/2010 | Augusto et al. | 700/277 |
| 2010/0318261 A1 | 12/2010 | Nagatomo | |
| 2011/0006903 A1 | 1/2011 | Niem | |
| 2011/0009062 A1 | 1/2011 | Anschutz et al. | |
| 2011/0010269 A1 | 1/2011 | Ballard | |

(56) References Cited

U.S. PATENT DOCUMENTS

| | | | |
|---|---|---|---|
| 2011/0057815 A1 | 3/2011 | King et al. | |
| 2011/0062230 A1 | 3/2011 | Ward, II et al. | |
| 2011/0093149 A1 | 4/2011 | Tanaka | |
| 2011/0095908 A1 | 4/2011 | Nadeem et al. | |
| 2011/0131358 A1 | 6/2011 | Ganesh et al. | |
| 2011/0137773 A1 | 6/2011 | Davis, III et al. | |
| 2011/0194541 A1* | 8/2011 | Menaceur et al. | 370/338 |
| 2011/0195699 A1 | 8/2011 | Tadayon et al. | |
| 2011/0218812 A1 | 9/2011 | Patel | |
| 2011/0224875 A1* | 9/2011 | Cuddihy et al. | 701/42 |
| 2011/0246301 A1 | 10/2011 | Bae et al. | |
| 2011/0264361 A1 | 10/2011 | Stahlin | |
| 2012/0010906 A1 | 1/2012 | Foladare et al. | |
| 2012/0083995 A1 | 4/2012 | Vorona | |
| 2012/0084480 A1 | 4/2012 | Reeves et al. | |
| 2012/0086717 A1 | 4/2012 | Liu | |
| 2012/0095812 A1 | 4/2012 | Stefik et al. | |
| 2012/0101690 A1 | 4/2012 | Srinivasan et al. | |
| 2012/0130580 A1 | 5/2012 | Omote et al. | |
| 2012/0143391 A1 | 6/2012 | Gee | |
| 2012/0231738 A1 | 9/2012 | Khamharn | |
| 2012/0265434 A1 | 10/2012 | Woodard et al. | |
| 2012/0276845 A1 | 11/2012 | Wikander | |
| 2013/0083467 A1 | 4/2013 | Ricci | |
| 2013/0099940 A1 | 4/2013 | Protopapas | |
| 2013/0111408 A1 | 5/2013 | Berus | |
| 2013/0131893 A1 | 5/2013 | Nakao et al. | |
| 2013/0134730 A1 | 5/2013 | Ricci | |
| 2013/0135118 A1 | 5/2013 | Ricci | |
| 2013/0138591 A1 | 5/2013 | Ricci | |
| 2013/0138714 A1 | 5/2013 | Ricci | |
| 2013/0141247 A1 | 6/2013 | Ricci | |
| 2013/0141252 A1 | 6/2013 | Ricci | |
| 2013/0143495 A1 | 6/2013 | Ricci | |
| 2013/0143546 A1 | 6/2013 | Ricci | |
| 2013/0143601 A1 | 6/2013 | Ricci | |
| 2013/0144459 A1 | 6/2013 | Ricci | |
| 2013/0144460 A1 | 6/2013 | Ricci | |
| 2013/0144461 A1 | 6/2013 | Ricci | |
| 2013/0144462 A1 | 6/2013 | Ricci | |
| 2013/0144463 A1 | 6/2013 | Ricci et al. | |
| 2013/0144469 A1 | 6/2013 | Ricci | |
| 2013/0144474 A1 | 6/2013 | Ricci | |
| 2013/0144486 A1 | 6/2013 | Ricci | |
| 2013/0144520 A1 | 6/2013 | Ricci | |
| 2013/0144657 A1 | 6/2013 | Ricci | |
| 2013/0145065 A1 | 6/2013 | Ricci | |
| 2013/0145279 A1 | 6/2013 | Ricci | |
| 2013/0145297 A1 | 6/2013 | Ricci et al. | |
| 2013/0145360 A1 | 6/2013 | Ricci | |
| 2013/0145401 A1 | 6/2013 | Ricci | |
| 2013/0145482 A1 | 6/2013 | Ricci et al. | |
| 2013/0147638 A1 | 6/2013 | Ricci | |
| 2013/0151031 A1 | 6/2013 | Ricci | |
| 2013/0151065 A1 | 6/2013 | Ricci | |
| 2013/0151088 A1 | 6/2013 | Ricci | |
| 2013/0152003 A1 | 6/2013 | Ricci et al. | |
| 2013/0154298 A1 | 6/2013 | Ricci | |
| 2013/0158821 A1 | 6/2013 | Ricci | |
| 2013/0166097 A1 | 6/2013 | Ricci | |
| 2013/0167159 A1 | 6/2013 | Ricci et al. | |
| 2013/0179198 A1 | 7/2013 | Bowne et al. | |
| 2013/0241720 A1 | 9/2013 | Ricci et al. | |

OTHER PUBLICATIONS

International Search Report and Written Opinion for International (PCT) Patent Application No. PCT/US12/65615 mailed Apr. 30, 2013, 15 pages.

International Search Report and Written Opinion for International (PCT) Patent Application No. PCT/US12/65477 mailed Apr. 26, 2013, 11 pages.

"Cadillac: 2013 XTS Full-Size Luxury Sedan," Cadillac.com, 4 pages, Jun. 2012 internet archive, found at: (web.archive.org/web/20120606185204/http://www.cadillac.com/xts-luxury-sedan.html).

U.S. Appl. No. 13/462,593, filed May 2, 2012, Ricci et al.

U.S. Appl. No. 13/462,596, filed May 2, 2012, Ricci et al.

U.S. Appl. No. 13/840,240, filed Mar. 15, 2013, Ricci.

"Time-triggered CAN," CIA, © 2001-2013, 4 pages, found at: (www.can-cia.org/index.php?id+166).

Davis et al. "Controller Area Network (CAN) schedulability analysis: Refuted, revisited and revised," Real-Time Systems, Apr. 2007, vol. 35, No. 3, pp. 239-272.

Di Natale "Controller Area Network," Dec. 2009, 54 pages.

Fonseca et al. "Scheduling for a TTCAN network with a stochastic optimization algorithm," Proceedings 8th Internatioanl CAN Conference, Jan. 2002, 7 pages.

HALOsonic (TM) Noise Management Solutions; Internet Article printed on May 2, 2012 from http://www.harman.com/automotive/en-us/products-innovations/innovations/halosonic . . . ; 3 pgs.

Hartwich et al. "CAN Network with Time Triggered Communication," Robert Bosch GmbH Proceedings 7th International CAN Conference, Jul. 2000, 7 pages.

Idstein et al. "Using the Controller Area Network for Communication Between Prostesis Sensors and Control Systems," Proceedings of the 2011 MyoElectric Controls/Powered Prostetics Symposium Fredericton, New Brunswick, Canada, Aug. 14-19, 2011, 4 pages.

Lotus Evora 414E Hybrid 2010; Internet Article printed on May 2, 2012 from http://www.dieselstation.com/cars/lotus-evora-414e-hybrid-2010-a2543.html; 5 pgs.

Lee "Cadillac revamps the instrument panel with CUE," CNET Reviews, Oct. 11, 2011, 5 pages, found at: (reviews.cnet.com/8301-12261_7-20118807-10356022/cadillac-revamps-the-instrument-panel-with-cue/).

Marturano "General Motors Takes a CUE from Customers," InContext, Nov. 8, 2011, 3 pages, found at: (incontextdesign.com/blog/general-motors-takes-a-cue-from-customers/).

Official Action for U.S. Appl. No. 13/678,745, mailed Oct. 1, 2013 8 pages.

Purcher "Apple Invents In-Vehicle Holistic ID for "iOS in the Car"," Patently Apple, Dec. 2013, 8 pages [retrieved on Dec. 12, 2013 from: www.patentlyapple.com/patently-apple/2013/12/apple-invents-in-vehicle-holistic-id-for-ios-in-the-car.html].

International Search Report and Written Opinion for International (PCT) Patent Application No. PCT/US2013/050600, mailed Jan. 9, 2014 9 pages.

Official Action for U.S. Appl. No. 13/678,710, mailed Dec. 31, 2013 8 pages.

Official Action for U.S. Appl. No. 13/678,726, mailed Nov. 7, 2013 9 pages.

Official Action for U.S. Appl. No. 13/678,726, mailed Jan. 28, 2014 10 pages.

Official Action for U.S. Appl. No. 13/678,745, mailed Feb. 6, 2014 9 pages.

Official Action for U.S. Appl. No. 13/679,292, mailed Nov. 14, 2013 19 pages.

"A8: Technology as standard," Screen-shots from Audi.co.uk, 2014 [retrieved on Apr. 16, 2014], 1 page. Retrieved from: www.audi.co.uk/new-cars/a8/a8/technology-as-standard/mmi-touch.html.

"Audi A8 MMI Touch," Audi of America, Jan. 7, 2011, [retrieved on Apr. 16, 2014], 2 pages. Retrieved from: www.youtube.com/watch?v=O2nZ-WHo9IA.

"Halosonic: Sound Technology with Vision," news article, Feb. 21, 2012, found at: www.lotuscars.comb/gb/news/engineering/haosonic-sound-technology-vision, 1 page.

Diaz, "Audi New MMI Touch Input System Makes Perfect Sense," Gizmodo.com, Dec. 1, 2009 [retrieved on Apr. 16, 2014], 12 pages. Retrieved from: http://gizmodo.com/5416342/audi-new-mmi-touch-input-system-makes-perfect-sense.

International Preliminary Report on Patentability for International (PCT) Patent Application No. PCT/US12/65423 mailed May 20, 2014, 17 pages.

International Preliminary Report on Patentability for International (PCT) Patent Application No. PCT/US12/65615 mailed May 20, 2014, 10 pages.

Official Action for U.S. Appl. No. 13/678,710, mailed Jun. 9, 2014 10 pages.

(56) References Cited

OTHER PUBLICATIONS

Official Action for U.S. Appl. No. 13/678,722, mailed Mar. 27, 2014 6 pages.
Notice of Allowance for U.S. Appl. No. 13/678,726, mailed Mar. 28, 2014 7 pages.
Official Action for U.S. Appl. No. 13/678,735, mailed Apr. 24, 2014 9 pages.
Official Action for U.S. Appl. No. 13/678,745, mailed May 23, 2014 9 pages.
Official Action for U.S. Appl. No. 13/679,306, mailed May 7, 2014 7 pages.
Notice of Allowance for U.S. Appl. No. 13/679,292, mailed Apr. 10, 2014 8 pages.
Notice of Allowance for U.S. Appl. No. 13/678,722, mailed Aug. 14, 2014 8 pages.
Official Action for U.S. Appl. No. 13/678,753, mailed Jul. 11, 2014 13 pages.
Official Action for U.S. Appl. No. 13/679,306, mailed Sep. 3, 2014 10 pages.
Official Action for U.S. Appl. No. 13/679,369, mailed Jul. 3, 2014 12 pages.
Official Action for U.S. Appl. No. 13/679,443, mailed Aug. 15, 2014 7 pages.
Notice of Allowance for U.S. Appl. No. 13/678,710, mailed Oct. 24, 2014 6 pages.
Notice of Allowance for U.S. Appl. No. 13/678,726, mailed Aug. 18, 2014 7 pages.
Official Action for U.S. Appl. No. 13/678,735, mailed Oct. 10, 2014 9 pages.
Official Action for U.S. Appl. No. 13/679,680, mailed Oct. 23, 2014 21 pages.
International Preliminary Report on Patentability for International (PCT) Patent Application No. PCT/US2013/050600, mailed Jan. 29, 2015 8 pages.
Notice of Allowance for U.S. Appl. No. 13/678,735, mailed Jan. 21, 2015 10 pages.
U.S. Appl. No. 61/389,000, filed Oct. 1, 2010, Sirpal et al.
Notice of Allowance for U.S. Appl. No. 13/678,745, mailed Dec. 9, 2014 5 pages.
Notice of Allowance for U.S. Appl. No. 13/678,753, mailed Dec. 31, 2014 11 pages.
Official Action for U.S. Appl. No. 13/679,306, mailed Dec. 26, 2014 13 pages.
Official Action for U.S. Appl. No. 13/679,369, mailed Dec. 26, 2014 37 pages.
Official Action for U.S. Appl. No. 13/679,680, mailed Feb. 24, 2015 26 pages.
Official Action for U.S. Appl. No. 13/679,443, mailed Jan. 5, 2015 7 pages.

* cited by examiner

VEHICLE CLIMATE CONTROL

CROSS REFERENCE TO RELATED APPLICATION

The present application claims the benefits of U.S. Provisional Application Ser. Nos. 61/560,509, filed Nov. 16, 2011; 61/637,164, filed Apr. 23, 2012; and 61/663,335, filed Jun. 22, 2012, all entitled "COMPLETE VEHICLE ECOSYSTEM", 61/646,747, filed on May 14, 2012, entitled "Branding of Electrically Propelled Vehicles Via the Generation of Specific Operating Sounds"; 61/653,275, filed on May 30, 2012, entitled "Vehicle Application Store for Console"; 61/653,264, filed on May 30, 2012, entitled "Control of Device Features Based on Vehicle State"; 61/653,563, filed on May 31, 2012, entitled "Complete Vehicle Ecosystem"; 61/672,483, filed on Jul. 17, 2012, entitled "Vehicle Climate Control"; 61/714,016, filed on Oct. 15, 2012, entitled "Vehicle Middleware;" and 61/715,699, filed Oct. 18, 2012, entitled "Vehicle Middleware," each of which is incorporated herein by this reference in its entirety.

Cross reference is made to U.S. patent application Ser. No. 13/420,236, filed on Mar. 14, 2012, entitled, "Configurable Vehicle Console"; Ser. No. 13/420,240, filed on Mar. 14, 2012, entitled "Removable, Configurable Vehicle Console"; Ser. No. 13/462,593, filed on May 2, 2012, entitled "Configurable Dash Display"; Ser. No. 13/462,596, filed on May 2, 2012, entitled "Configurable Heads-Up Dash Display"; Ser. No. 13/679,459, filed on Nov. 16, 2012, entitled "Vehicle Comprising Multi-Operating System"; Ser. No. 13/679,234, filed on Nov. 16, 2012, entitled "Gesture Recognition for On-Board Display"; Ser. No. 13/679,412, filed on Nov. 16, 2012, entitled "Vehicle Application Store for Console"; Ser. No. 13/679,857, filed on Nov. 16, 2012, entitled "Sharing Applications/Media Between Car and Phone (Hydroid)"; Ser. No. 13/679,878, filed on Nov. 16, 2012, entitled "In-Cloud Connection for Car Multimedia"; Ser. No. 13/679,875, filed on Nov. 16, 2012, entitled "Music Streaming"; Ser. No. 13/679,676, filed on Nov. 16, 2012, entitled "Control of Device Features Based on Vehicle State"; Ser. No. 13/678,673, filed on Nov. 16, 2012, entitled "Insurance Tracking"; Ser. No. 13/678,691, filed on Nov. 16, 2012, entitled "Law Breaking/Behavior Sensor"; Ser. No. 13/678,699, filed on Nov. 16, 2012, entitled "Etiquette Suggestion"; Ser. No. 13/678,710, filed on Nov. 16, 2012, entitled "Parking Space Finder Based on Parking Meter Data"; Ser. No. 13/678,722, filed on Nov. 16, 2012, entitled "Parking Meter Expired Alert"; Ser. No. 13/678,726, filed on Nov. 16, 2012, entitled "Object Sensing (Pedestrian Avoidance/Accident Avoidance)"; Ser. No. 13/678,735, filed on Nov. 16, 2012, entitled "Proximity Warning Relative to Other Cars"; Ser. No. 13/678,745, filed on Nov. 16, 2012, entitled "Street Side Sensors"; Ser. No. 13/678,753, filed on Nov. 16, 2012, entitled "Car Location"; Ser. No. 13/679,441, filed on Nov. 16, 2012, entitled "Universal Bus in the Car"; Ser. No. 13/679,864, filed on Nov. 16, 2012, entitled "Mobile Hot Spot/Router/Application Share Site or Network"; Ser. No. 13/679,815, filed on Nov. 16, 2012, entitled "Universal Console Chassis for the Car"; Ser. No. 13/679,476, filed on Nov. 16, 2012, entitled "Vehicle Middleware"; Ser. No. 13/679,306, filed on Nov. 16, 2012, entitled "Method and System for Vehicle Data Collection Regarding Traffic"; Ser. No. 13/679,369, filed on Nov. 16, 2012, entitled "Method and System for Vehicle Data Collection"; Ser. No. 13/679,680, filed on Nov. 16, 2012, entitled "Communications Based on Vehicle Diagnostics and Indications"; Ser. No. 13/679,443, filed on Nov. 16, 2012, entitled "Method and System for Maintaining and Reporting Vehicle Occupant Information"; Ser. No. 13/678,762, filed on Nov. 16, 2012, entitled "Behavioral Tracking and Vehicle Applications"; Ser. No. 13/679,292, filed Nov. 16, 2012 entitled "Branding of Electrically Propelled Vehicles Via the Generation of Specific Operating Output"; Ser. No. 13/840,240, filed on Mar. 15, 2013, entitled "Controller Area Network Bus"; Ser. No. 13/678,773, filed on Nov. 16, 2012, entitled "Location Information Exchange Between Vehicle and Device"; Ser. No. 13/679,887, filed on Nov. 16, 2012, entitled "In Car Communication Between Devices"; Ser. No. 13/679,842, filed on Nov. 16, 2012, entitled "Configurable Hardware Unit for Car Systems"; Ser. No. 13/679,204, filed on Nov. 16, 2012, entitled "Feature Recognition for Configuring a Vehicle Console and Associated Devices"; Ser. No. 13/679,350, filed on Nov. 16, 2012, entitled "Configurable Vehicle Console"; Ser. No. 13/679,358, filed on Nov. 16, 2012, entitled "Configurable Dash Display"; Ser. No. 13/679,363, filed on Nov. 16, 2012, entitled "Configurable Heads-Up Dash Display"; and Ser. No. 13/679,368, filed on Nov. 16, 2012, entitled "Removable, Configurable Vehicle Console". The entire disclosures of the applications listed above are hereby incorporated by reference, in their entirety, for all that they teach and for all purposes.

BACKGROUND

Modern vehicles have various features that enhance the comforts of human operators and other occupants. Climate control is especially important for comfort, and further enhances human operational efficiency, which further enhances safety when operating the vehicle. As a vehicle usually operates in unshielded open terrain, the vehicle interior should provide a localized indoor environment with a stable temperature and/or climate within the comfortable human operational range.

Existing vehicle climate control systems typically sense interior temperature and compare the sensed interior temperature to temperature control settings or preferences of an occupant with the goal to maintain the sensed interior temperature within a close range of the setting or preference. When the sensed interior temperature is below the setting or preference, the climate control system heats the interior, and, when the sensed temperature is above the setting or preference, the climate control system cools the interior.

There is a need in the art to provide for a climate control in a vehicle that enhances the comforts of human operators and other occupants.

SUMMARY

The present disclosure is directed to an automated climate control system for a vehicle that considers factors, in addition to or in lieu of, the internal temperature of the vehicle passenger compartment.

In one embodiment, a vehicle and method are provided comprising:
  a climate control system operable to control a climate in an interior of the vehicle, the climate control system comprising:
  a computer readable memory comprising climate control logic; and
  a microprocessor to execute the logic.

The climate control logic performs the following operations when executed by the microprocessor:
  (C1) senses climate control information, in lieu of or in addition to an interior temperature of the vehicle, to select a set of vehicle climate control parameters and/or settings for the vehicle interior, wherein the sensed climate control information is one or more of the following:

a sensed body condition and/or characteristic of a selected occupant of the vehicle;
a sensed identity of the selected occupant;
a sensed exterior climate parameter respecting an exterior climate of the vehicle;
a sensed spatial location of the vehicle;
a sensed time;
a historical set of sensed parameters; and
a set of vehicle climate control parameters and/or settings selected for a different second nearby vehicle, in temporal proximity to a time of selection of the vehicle climate control parameters and/or settings for the vehicle;

(C2) controls, in accordance with the selected set of vehicle climate control parameters and/or settings, an operation of the climate control system of the vehicle.

When the sensed climate control information is (i), the sensed body condition and/or characteristic can be one or more of body temperature, a stress level, heart rate, pulse rate, a body movement, an emotional state, a blood alcohol content, a blood oxygen content, and a degree of mental alertness.

When the sensed climate control information is (ii), a plurality of pre-set climate control profiles can be stored in a memory of the vehicle correspond to a plurality of potential occupants of the vehicle.

When the sensed climate control information is (iii), the sensed climate control information comprises one or more of a temperature, (relative or absolute) humidity, air (or barometric) pressure, wind speed, wind direction, rainfall amount, rainfall intensity, solar flux density, total solar flux, dew point temperature, wet bulb temperature, heat index, wind run, wind gust, and evapotranspiration of the exterior climate.

When the sensed climate control information is (iv), the sensed spatial location of the vehicle is typically received from a satellite positioning system.

When the sensed climate control information is (v), the sensed time can be one or more of a time-of-day, day-of-month, and/or month-of-year.

When the sensed climate control information is (vi), the historical set of sensed parameters is often related to a set of vehicle climate control parameters and/or settings selected by the occupant in response to the historical set of sensed parameters.

When the sensed climate control information is (vii).

The climate control operation typically includes one or more of temperature, humidity, atmospheric pressure, and air movement and one or more of heating, ventilation, and air conditioning.

In one configuration, a separate set of climate control parameters and/or settings are determined for each current occupant of the vehicle and a consolidated set of climate control parameters and/or settings are applied in the controlling step.

In one configuration, the climate control parameters and/or settings are determined remotely from the selected vehicle and provided to the selected vehicle by the Internet.

The present disclosure can provide a number of advantages relative to conventional climate control systems. The presently disclosed climate control system can provide enhanced comfort for its occupants. It can provide relatively simple or complex climate control algorithms to provide climate control recommendations for a user. Alternatively, the climate control algorithms can select, without user input, climate control parameters and/or settings. This can provide the user with a "hands free" climate control system to reduce a likelihood of driver distraction and risks of accidents.

These and other advantages can be provided by the various aspects, embodiments, and/or configurations of the present disclosure. Also, while the disclosure is presented in terms of exemplary embodiments, it should be appreciated that individual aspects of the disclosure can be separately claimed.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "biometric" refers to the process by which a person's unique physical and/or other trait is detected and recorded by an electronic device or system as a way to confirm identity.

The term "climate control" refers to a technology or scheme that can alter, control, and/or generate artificial climate conditions for an environment. The climate of the environment usually refers to the air temperature, (absolute and/or relative) humidity, and/or air pressure (e.g., atmospheric pressure), movement of air, i.e., wind, and/or other measurements that relate to the atmosphere of an environment. An exemplary climate control system includes HVAC (heating, ventilation, and air conditioning) systems. A typical use of a climate control system is to alter the environmental comfort of an indoor environment. In a vehicle, climate control parameters or settings typically refer to air or contacted surface (e.g., seat and/or steering wheel) temperature, air pressure, fan speed (or air flow rate), (absolute and/or relative) humidity level, and degree or level of ultraviolet light penetration level into the vehicle interior (which may be controlled by polarization of windows, visor position, and the like).

The term "computer-readable medium" refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The terms "dash" and "dashboard" and variations thereof, as used herein, are used interchangeably and include any panel and/or area of a vehicle disposed adjacent to an operator, user, and/or passenger. Typical dashboards may include but are not limited to one or more control panel, instrument housing, head unit, indicator, gauge, meter, light, audio equipment, computer, screen, display, HUD unit, and graphical user interface.

The terms "determine", "calculate" and "compute," and variations thereof, as used herein, are used interchangeably and include any type of methodology, process, mathematical operation or technique.

The term "display" refers to a portion of a screen used to display the output of a computer to a user.

The term "displayed image" refers to an image produced on the display. A typical displayed image is a window or desktop. The displayed image may occupy all or a portion of the display.

The term "gesture capture" refers to a sense or otherwise a detection of an instance and/or type of user gesture. The gesture capture can occur in one or more areas of the screen, A gesture region can be on the display, where it may be referred to as a touch sensitive display or off the display where it may be referred to as a gesture capture area The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element. Also, while the disclosure is presented in terms of exemplary embodiments, it should be appreciated that individual aspects of the disclosure can be separately claimed.

The term "satellite positioning system receiver" refers to a wireless receiver or transceiver to receive and/or send location signals from and/or to a satellite positioning system, such as the Global Positioning System ("GPS") (US), GLONASS (Russia), Galileo positioning system (EU), Compass navigation system (China), and Regional Navigational Satellite System (India).

The term "screen," "touch screen," or "touchscreen" refers to a physical structure that enables the user to interact with the computer by touching areas on the screen and provides information to a user through a display. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates.

The term "user interface" as used herein refers to a system or scheme that facilitates interaction between humans and machines. User interfaces typically include input functions that allow the human users to control and/or operate the underlying machines and output functions that indicate to the human users on the effect of such control and/or operation. Examples of user interfaces include graphical user interfaces (GUI), touchscreens, lighted graphical panels, and LED panels with buttons. User interfaces also include non-visual input and/or output such as gesture interfaces, and/or voice recognition and speech output.

The term "vehicle" as used herein includes any conveyance, or model of a conveyance, where the conveyance was originally designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

The term "window" refers to a, typically rectangular, displayed image on at least part of a display that contains or provides content different from the rest of the screen. The window may obscure the desktop.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible for utilizing, alone or in combination, one or more of the features set forth above or described in detail below.

Figure 1:
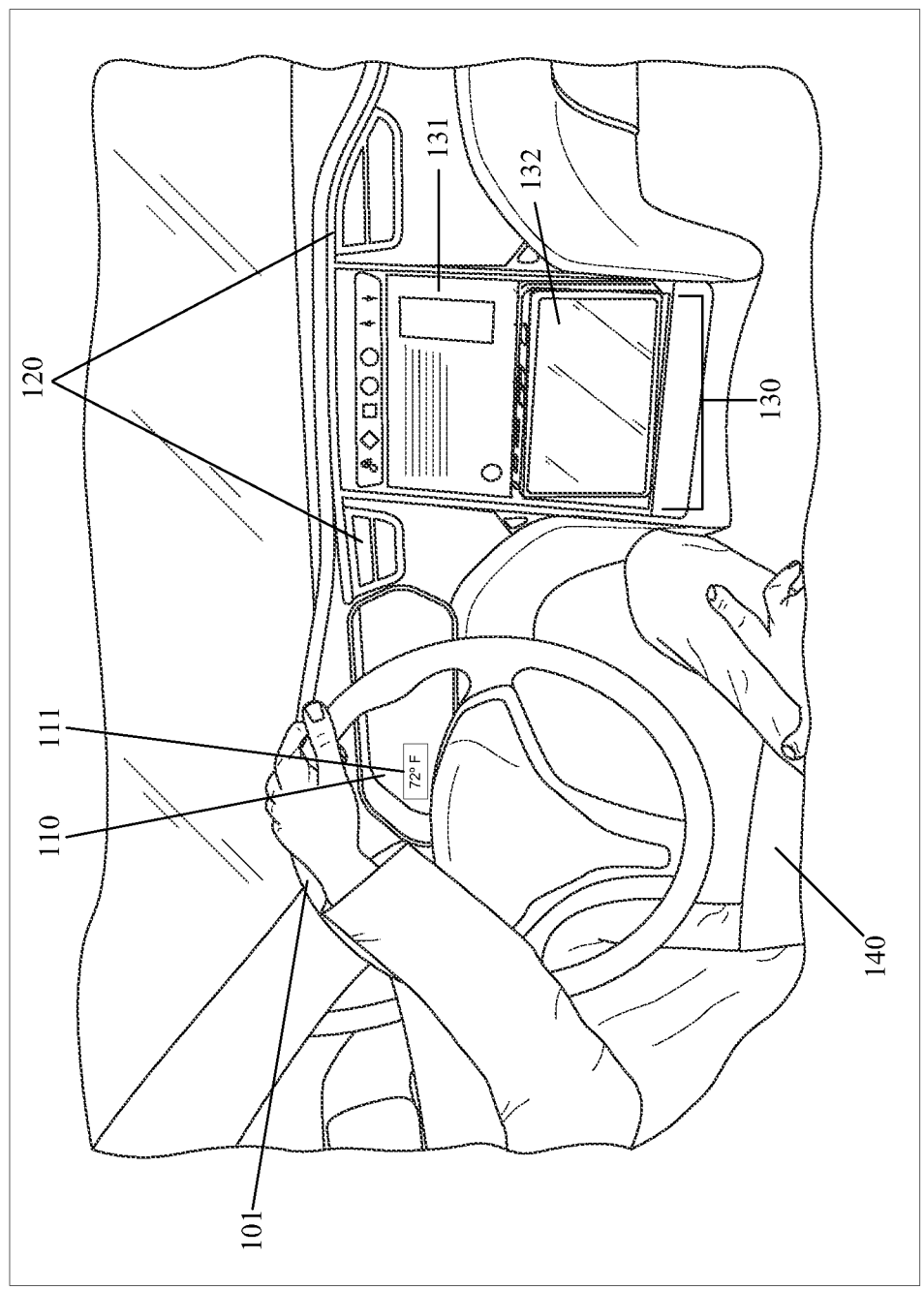
FIG. 1 illustrates a front view of the console of a vehicle according to an embodiment of the disclosure.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In a typical vehicle climate system in the related art, climate control usually involves setting a dial or otherwise setting a preference to a desired ambient temperature for the passenger compartment. In operation, a thermometer measures the current ambient temperature in the passenger compartment. The climate control system then compares to the current ambient temperature to the desired ambient temperature and determines if the passenger compartment needs to heat up or cool down. Heated or cooled air is generated by a climate control unit and is blown into the passenger compartment by convection to bring the temperature of the passenger compartment closer to the desired temperature. The typical vehicle climate system in the related art takes into account only the absolute current ambient temperature relative to the desired temperature but does not take into account the present conditions and needs of the human operator or other occupants.

In one aspect, a set of vehicle climate control parameters or settings is a function of sensed present conditions and/or needs of the human operator or other occupants. For example, the set of vehicle climate control parameters or settings is a function of a sensed body condition or characteristic of an occupant. The sensed body condition and/or characteristic, for instance, can be one or more of body temperature, a stress level, heart rate, pulse rate, a body movement, an emotional state, a blood alcohol content, a blood oxygen content, and a degree of mental alertness For example, if a human operator had just entered the vehicle after a long run in the cold weather, the body temperature of the human operator might actually be higher than the ambient temperature. Venting heated air would have actually decreased human comfort. A non-exercising human entering the vehicle after freezing outside would be treated differently due to his or her lower body temperature. Therefore, it is desirable for a vehicle climate control system to be able to adjust vehicle climate based on actual human body temperature.

In another aspect, a set of vehicle climate control parameters or settings is a function of a measured stress level of a human operator of a vehicle. For example, if a human operator of a vehicle has been continuously driving for a while, and his or her stress level has been increasing over the course of time (i.e., from external events such as being cut off or simply from the continuous driving that reaches the limits of human tolerance), it would be desirable to give the human operator a warning as the stress would affect likely health and safety.

In another aspect, a set of vehicle climate control parameters or settings is a function of a sensed identity of a selected occupant or group of occupants. Such identification may be effected by user input, such as to a touch screen, a user characteristic, such as the sensed weight of the occupant, a seat, pedal, and/or steering wheel setting selected by the occupant, a biometric technique, and the like. Each occupant may have preselected preferred climate control parameters or settings globally, seasonally, in response to defined outside temperatures, and the like. The preferences may also be based on historical climate control parameters or settings of a selected occupant indexed to contextual information, such as an outside weather condition (e.g., temperature).

In another aspect, a set of vehicle climate control parameters or settings is a function of a sensed exterior climate parameter, such as temperature, (relative or absolute) humidity, air (or barometric) pressure, wind speed, wind direction, rainfall amount, rainfall intensity, solar flux density, total solar flux, dew point temperature, wet bulb temperature, heat index, wind run, wind gust, and evapotranspiration. As will be appreciated, an interior climate of a vehicle is related to the climate exterior to the vehicle.

In another aspect, a set of vehicle climate control parameters or settings is a function of a sensed spatial location of a vehicle, such as determined by a satellite positioning system receiver. As will be appreciated, the climate exterior to the vehicle and therefore the interior climate of a vehicle are related to the sensed vehicle location.

In another aspect, a set of vehicle climate control parameters or settings is a function of a sensed time, such as a day or month (e.g., a seasonal time of year) or time of day (e.g., day or night, early morning, mid-morning, late morning, noon, early afternoon, mid-afternoon, late afternoon, evening, nighttime, and the like). As will be appreciated, the climate exterior to the vehicle and therefore the interior climate of a vehicle are related to the sensed time.

In another aspect, a set of vehicle climate control parameters or settings is a function of a historical set of sensed parameters. For example, if an occupant previously selected a set of vehicle climate control parameters or settings when a first set of sensed parameters existed and a second set of sensed parameters is currently sensed that is similar to the first set of sensed parameters, the previously selected set of vehicle climate control parameters or settings may be currently selected automatically or recommended to the occupant.

In another aspect, an automatically selected set of vehicle climate control parameters or settings is a function of respective sets of vehicle climate control parameters or settings determined, based on plural of the above factors, for a selected occupant of the vehicle.

In another aspect, an automatically selected set of vehicle climate control parameters or settings is a function of respective sets of vehicle climate control parameters or settings determined, based on one or more of the above factors, for each of multiple occupants of the vehicle. The selection can be based on any suitable mathematical algorithm, such as by selecting a weighted or unweighted average, median, or mode of multiple values for a selected climate control parameter. For example, if three different climate control temperatures correspond to three vehicle occupants, the vehicle climate control system can selected a weighted or unweighted average, median, or mode of the temperatures as the climate control temperature parameter setting.

In another aspect, a set of vehicle climate control parameters or settings is selected remotely through the Internet. The vehicle is assigned a unique Internet Protocol ("IP") address, such as an IP address defined by Internet Protocol version 6 ("IPv6"). For example, the vehicle user can select the set of vehicle climate control parameters or settings while in an office or at home in response to current weather condition(s) or forecasted weather condition(s).

In another aspect, climate control parameters or settings selected by occupants of other proximally located vehicles are used to determine the vehicle climate control parameters and settings of the selected vehicle. As an Internet node, the selected vehicle, whether or not currently activated or in operation, can communicate with other vehicles, also configured as Internet nodes, and collect selected information, such as currently selected climate control parameters and settings.

Such collected climate control parameters and settings can be used to select automatically or recommend to the user of the selected occupant climate control parameters and settings to be implemented in the selected vehicle. The climate control parameters and settings for the current vehicle can be generated using any suitable algorithm, such as a (weighted or unweighted) mean (with a parameter or setting being weighted by a relative distance of the respective vehicle to the selected vehicle with closer vehicles being given a higher weighting factor than more remotely located vehicles), mean, median, and/or mode.

FIG. 1 illustrates a cross-sectional view of the passenger compartment of a vehicle 100 according to some embodiments of the disclosure.

Vehicle 100 has various mechanical and electrical subsystems that perform various functions during operation of the vehicle 100. Vehicle 100 can be generally separated into two compartments: the engine compartment and the passenger compartment.

The engine compartment, which is usually under the hood, contains the various mechanical and electrical components and subsystems to move the vehicle 100. The engine compartment typically includes an engine, a transmission system, the throttle and braking control system, and/or other systems that operate to move vehicle 100.

The passenger compartment contains various controls and displays that allow a human operator to control the vehicle 100 and also contains other subsystems which improve the human occupant's enjoyment and comfort while operating the vehicle 100. The passenger compartment typically includes instrument displays for the various mechanical and electrical subsystems. These displays are typically collectively grouped to a conveniently viewable position for a human operator while operating vehicle 100. For example, dashboard 110 allows the human operator to continuously monitor and quickly assess the condition of vehicle 100 while driving. Other controls in the passenger compartment may include the steering wheel 101, the throttle and brake pedals, and the switches activating various lights, (i.e., headlights or signal lights, or other miscellaneous controls such as the switch that opens access to the engine compartment). The passenger compartment also includes various subsystems for the entertainment, convenience, and comfort of the human occupants. These subsystems are generally located within the central console 130 of the passenger compartment. Central console 130 may contain a radio or entertainment console 131 and/or a general purpose computing unit 132.

General purpose computing unit 132 may include a microprocessor, a memory, a display, and/or an input device, (i.e., a touch screen or buttons). In some embodiments, general purpose computing unit 132 may only include a display; the processor and/or memory may be shared with other subsystems or may be distributed as part of a network, (i.e., via a controller area network (CAN) bus). General purpose computing unit 132 may include various functions for navigation, entertainment, comfort, and/or other functions useful for a vehicle environment. For example, in one aspect, general purpose computing unit 132 may be coupled to a satellite positioning system ("SPS") receiver to display the location of the vehicle and to perform navigation functions given inputs from the human operator. In other aspects, general purpose computing unit 132 may display videos or be coupled to a satellite radio for entertainment purposes. In another aspect, general purpose computing unit 132 may act as another vehicle condition display device, (i.e., similar to dashboard 110). General purpose computing unit 132 may also operate to allow a human occupant to program a customized climate control system for vehicle 100. Typically, general purpose computing unit 132 is able to load instructions as part of a software program from memory and process these instructions via a processor.

In some embodiments of the disclosure, general purpose computing unit 132 includes a touch sensitive front screen. In some embodiments, the entire front surface of the front screen may be touch sensitive and capable of receiving input by a user touching the front surface of the front screen. The front screen includes a touch sensitive display which, in addition to being touch sensitive, also displays information to a user. In other embodiments, the screen may include more than one display area.

In addition to touch sensing, general purpose computing unit 132 may also include areas that receive input from a user without requiring the user to touch the display area of the screen. For example, the front screen may be configured to display content to the touch sensitive display, while at least one other area may be configured to receive touch input via a gesture capture area. The front screen includes at least one gesture capture area. This at least one gesture capture area is able to receive input by recognizing gestures made by a user touching the gesture capture area surface of the front screen. In contrast to the touch sensitive display, the gesture capture area is commonly not capable of rendering a displayed image.

Various sensors 210a-n can be placed at various locations within the passenger compartment and outside the vehicle 100. The sensors 210a-n can measure any desired information, including body condition or characteristic of a vehicle occupant (e.g., body temperature at one or more body locations, heart rate, pulse rate, body movements, emotional state, stress, anger, and/or anxiety level, blood alcohol content, drowsiness, alertness, and the like), identity of the occupant, exterior climate parameter (such as temperature, (relative or absolute) humidity, air (or barometric) pressure, wind speed, wind direction, rainfall amount, rainfall intensity, solar flux density, total solar flux, dew point temperature, wet bulb temperature, heat index, wind run, wind gust, and/or evapotranspiration), climate control parameters or settings selected by occupants of other proximally located vehicles, and time (e.g., a seasonal time of year) or time of day (e.g., day or night, early morning, mid-morning, late morning, noon, early afternoon, mid-afternoon, late afternoon, evening, nighttime, and the like). In one configuration, temperature sensors are placed such that temperature can be taken from various locations inside and outside vehicle 100. Sensors are placed such that the ambient temperature outside vehicle 100, the ambient temperature inside vehicle 100, and the localized temperature of the human operator or other occupants can be determined. Specifically, temperature sensors are placed outside vehicle 100 to sense the outside ambient temperature, inside the passenger compartment to sense the ambient inside temperature, and at each seat 140 to sense the temperature of each human occupant in the seat. In other embodiments, sensors can be placed in vehicle 100 in other fixed or dynamic configurations; a dynamic configuration enables an operator or occupant of the vehicle, through a user interface, moving, adding, or deleting sensors as needed. Although temperature sensors are used in the discussion of this embodiment, other biometric and other sensors may be used in other embodiments. For example, heart and/or pulse rate sensors, which may be located on the steering wheel to interact with the operator's hand(s), may be used for further data on the conditions of the human operator.

In some embodiments, temperature and/or biometric sensors can further detect the existence or the lack of a human occupant at its local detection vicinity. Further, temperature, biometric sensors, and/or identity sensors can also be used to determine the identity of the human operator or a selected occupant.

In some aspects of an embodiment, the currently sensed climate control information may be integrated into the dashboard 101 as sensed climate control information display 111 or other instrument display. In other aspects, general purpose computing unit 132 or other processing subsystems in vehicle 100 may act as a combination of display, user input, and processing unit for advance climate control functions. For example, a temperature display may show the current ambient temperature for both inside and outside the vehicle and/or the body temperature for each human occupant. The presence and the identity of a human occupant at a seat may also be detected and displayed. The temperature display may also show the setting of a desired temperature for each human occupant or for a desired ambient temperature inside the passenger compartment generally. The temperature display may also show a recommended setting of a desired temperature for each human occupant or for a desired ambient temperature inside the passenger compartment generally. General purpose computing unit 132 may run a number of programs to set the temperature via an algorithm that processes the detected temperatures and the desired temperatures. For example, in one aspect of the embodiment, even if the outside ambient temperature is lower than the inside ambient temperature, a program may detect that a human occupant's body temperature is higher than the ambient temperature and therefore would override a normal routine that heats up the passenger compartment but alternately to cool off the human occupant instead.

Further, these programs may be combined with biometrics and/or identity sensors to load a different profile for each person. For example, biometrics and/or identity sensors may detect a specific person sitting at a car seat and load the default profile for the desired temperature. In another aspect, a program might use an adaptive algorithm to keep track of how a human occupant adjusts his or her desired temperature over time, and the adaptive algorithm can automatically adjust the temperature in a similar situation later. In yet another aspect of the embodiment, specific sensors may directly detect the comfort level or biological efficiencies of the human occupant and adjust the temperature and/or other climate parameters accordingly for improved comfort and/or efficiencies.

The various sensors communicate sensed climate control information to the general purpose computing unit 132 via wired or wireless interfaces and/or protocols. For example, the sensors and general purpose computing unit 132 may be wired directly and communicate via Ethernet, CAN bus, a propriety protocol, and/or other wired protocols as known in the art. The sensors and general purpose computing unit 132 may also communicate wirelessly via a Wi-Fi, Bluetooth, WiMax, infrared, or other wireless communications link. Further, in some aspects of an embodiment, some sensors may not be permanently embedded into vehicle 100. The sensors may be added and removed ad hoc, (i.e., carried personally by the human occupants as they enter and exit the vehicle and connect and disconnect to general purpose computing unit 132 when in the vicinity and as needed). The sensors can connect and disconnect with general purpose computing unit 132 via the various wired and wireless protocols as discussed above.

Further, it should be appreciated that the connection of the sensors to general purpose computing unit 132 as discussed can be any combination of both wired and wireless, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Figure 2:
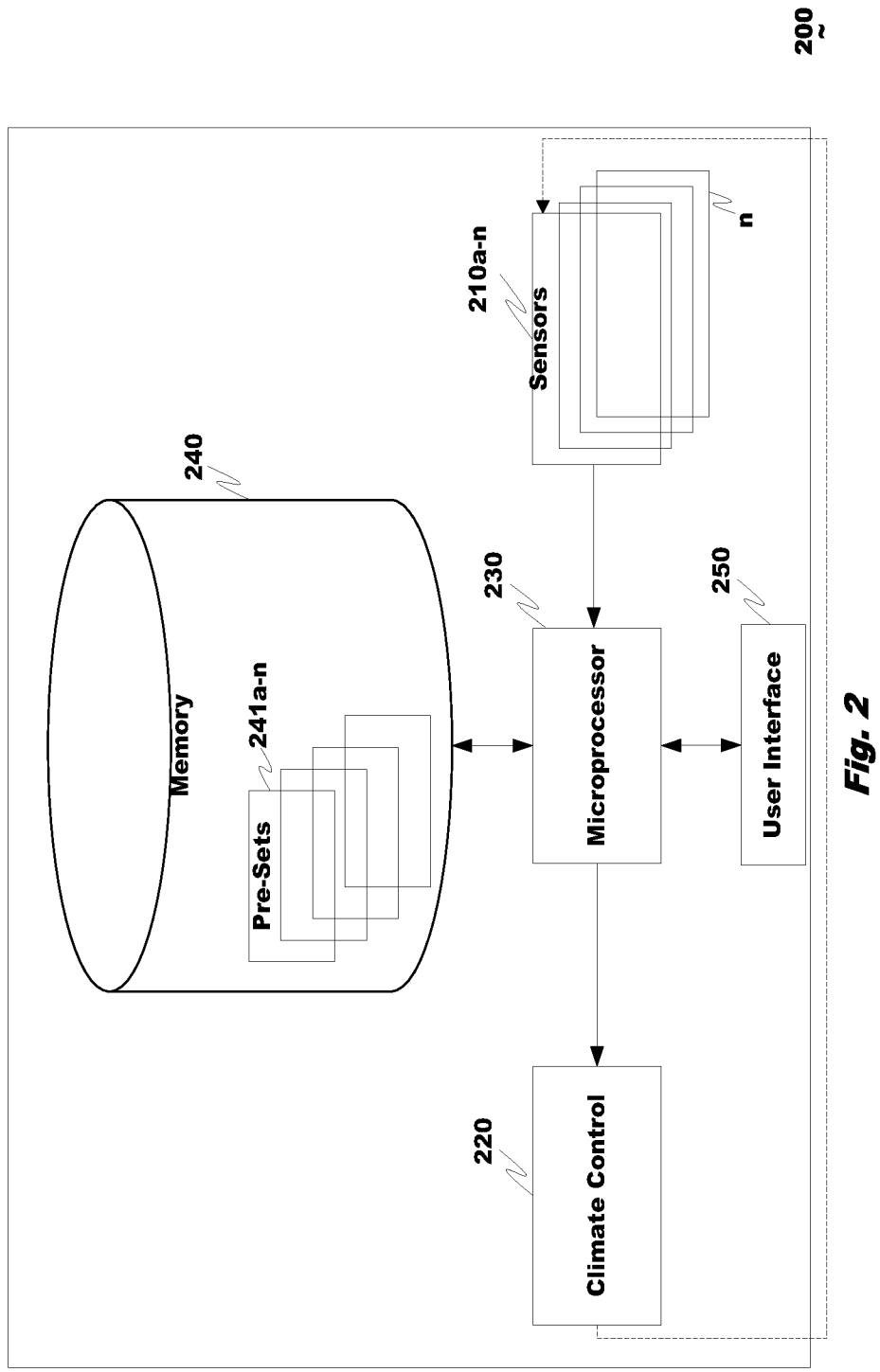
FIG. 2 illustrates a block diagram for a climate control system according to an embodiment of the disclosure.

FIG. 2 illustrates a block diagram for a climate control system according to some embodiments of the disclosure.

Climate control system 200 includes a plurality of sensors 210a-n, processor 230, memory 240, climate control 220, and user input 250. Sensors 210a-n, memory 240, climate control 220, and user input 250 are each coupled to processor 230.

Each of the plurality of sensors 210a-n are placed at various locations in an indoor or enclosed environment where climate control system 200 is installed to work. Further, some of the sensors 210a-n may be placed outside the indoor environment for comparative measurements of the outside conditions. In a preferred embodiment, the indoor environment is the passenger compartment of a vehicle. In one configuration, sensors 210a-n are temperature sensors or more generally other climate conditions or biometric sensors that measure the climate or human bodily conditions localized in the measurement vicinity of each sensor. Biometric and temperature sensors are placed at each seat of the vehicle to measure the temperature and other bodily conditions of the human occupant at that seat. Other temperature or climate sensors are placed at various locations inside and outside the passenger compartment to measure the temperature or other climate measures at the respective sensor's location.

Measurements from the sensors 210a-n are sent as inputs to microprocessor 230. Sensors 210a-n may be coupled to microprocessor 230 via a wired or wireless link. The respective locations of sensors 210a-n within the indoor environment may be fixed and are known to microprocessor 230. The locations of sensors 210a-n may also be dynamic. In some embodiments, the locations of sensors 210a-n can be moved within the indoor environment; sensors may also be added or removed. Data that accommodates the adding, deleting, and moving of sensors are also transmitted to microprocessor 230 via the wired or wireless link.

User interface 250 is coupled to microprocessor 230 and may consist of both user input and/or output components. In a preferred embodiment, touchscreen and a graphical user interface (GUI) is used to receive touch input from the user and display information about system 200 to the user. For a climate control system 200 that is adapted for a vehicle, user interface 250 may be a touchscreen that is installed into the center console of the passenger compartment of the vehicle. In some embodiments, user interface 250 may also include climate related displays (e.g., temperature display) at the dashboard or at other locations in the passenger compartment and have hard buttons as in a traditional vehicle climate control panel. Preferably, user interface 250 is coupled to processor 250 via a wired link.

Memory 240 is coupled to microprocessor 230 and is configured to store and recall data and instructions related to climate control system 200 to processor 230.

Specifically, memory 240 includes instructions for microprocessor 230 to process the received data from sensors 210a-n. In a preferred embodiment, the instructions include instructions to poll and receive various data sent by the sensors. The instructions also include instructions to receive the user inputs from user interface 250 and to send output data for display. Further, the instructions include instructions for processing the received data, storing and retrieving data from memory 240 and instructing climate control 220 to adjust the climate environment.

Memory 240 may also include a plurality of pre-sets 241a-n. Pre-sets 241a-n include a default profile for the operation climate control system 200. Pre-sets 241a-n can be pre-programmed to include at least one generic profile for operation in at least one known environment (i.e., pre-set 241a may contain one climate control profile (or set of parameters and settings) that takes into account the placement of sensors 210a-n in an environment and contains one or more algorithms that adjust the climate of the environment according to the readings from various sensors 210a-n). In other configurations, pre-sets 241a-n may be programmed by a human occupant through user interface 250. For example, the human occupant may want to set the locations of sensors 210a-n and/or preferred climate control parameters and settings of the human occupant.

In some embodiments of the disclosure, some of the pre-sets 241a-n may include specific climate control profiles for identified users. These specific pre-sets are loaded when a user is present and identified. In some configurations, a user may self-identify to climate control system 200 through user interface 250. In other configurations, sensors 210a-n may include specific sensors that can automatically identify a user (e.g., voice identification, fingerprint scan, retinal scan) or may identify a user by analyzing readings from temperature and biometric sensors (i.e., by temperature, breathing pattern, or other bodily signs). A user can also manually self-identify if the system misidentifies the user; the system can visually and vocally announce its identification to facilitate this process.

Climate control 220 includes the various devices and components that act to change the climate conditions of the environment. Typically, climate control 220 includes an HVAC system (e.g., devices that output heated or cooled air into the environment by convection). Climate control 220 may include other components such as a humidifier/dehumidifier that changes the humidity of the environment. Climate control may include a component, such as controllably and variably polarized windows to controllably positioned window shades (e.g., visors) to control a degree or level of UV light penetration into the passenger compartment of the vehicle. Climate control 220 may also include components that do not traditionally affect the climate but adds to the comfort of the occupants (i.e., an air filter or device that adds specific scents to the air).

The operation of climate control system 200 will be explained by examples.

In a first example, sensors 210a-n detects an ambient temperature within the environment. The detected ambient temperature is higher than the desired temperature set to climate control system 200. The desired temperature may be set by a user using user interface 250 or may be part of a generic pre-set 241a-n. According to instructions loaded from memory 240, microprocessor 230 processes the input data on the ambient temperature and the desired temperature and activates cooling and ventilation system of climate control 220 to cool the environment. Further, climate control 220 then activates its cooling and ventilation system to cool the environment. Climate control system 200 runs continuously. As climate control 220 is cooling the environment, sensors 210a-n continuously detect the ambient temperature. Therefore, climate control system 220 forms a feedback loop of constant sensing and adjustment. Once the ambient temperature reaches the desired temperature, microprocessor 230 deactivates climate control 220. In another configuration, the desired temperature may be kept at a certain interval (i.e., two degrees within 75° F.); climate control system 200 cools when the ambient temperature is above the interval (77° F.) and heats when the ambient temperature is below the interval (73° F.).

In another example, some of sensors 210a-n are placed in the vicinity of a human occupant (i.e., at the seat of a car). These sensors can detect the bodily conditions of the human occupant (i.e., body temperature), which may be different from the ambient climate condition (i.e., ambient temperature). For example, if the human occupant was outside jogging on a cold morning and getting in to a car that had parked overnight, the body temperature of the human occupant (e.g., 85° F.) would be higher than the ambient temperature (e.g., 50° F.). According to the first example, climate control system would heat up the car because the ambient temperature is lower than the desired temperature (75° F.). This is undesirable for the human occupant who actually needs to cool down rather than warm up since the actual body temperature (85° F.) is higher than the desired temperature (75° F.). In this example, microprocessor 230 uses body temperature as the basis and activates the cooling system of climate control 220 even though the ambient temperature would otherwise suggest warming up. Further, in one configuration, microprocessor 230 may activate ventilation of cool air only near the vicinity of the human occupant while activating the hot air for ventilation elsewhere in the vehicle so that the human occupant can get a blast of cool air to lower the body temperature while the ambient temperature of the environment will warm up. In another configuration, multiple occupants may have different body temperatures; the local ventilation for each occupant is activated accordingly.

In yet another example, the identity of the human occupant is known to climate control system 200. As discussed, climate control system 200 can know the identity of the human occupant through sensors 210a-n or through self-identification via user interface 250. A stored pre-set profile, which indicates the climate preference of the human occupant, can be loaded from memory 240. Alternately, pre-set profiles can be programmed through user interface 250 if either the human occupant does not have a pre-set stored in memory 240 or wishes to setup a different pre-set profile. When a pre-set profile is loaded, its settings override other loaded instructions. For example, if the human occupant has a high body temperature but its pre-set profile indicates that the occupant does not want to be cooled down, the cooling system of climate control 220 will not be activated. Further, each pre-set profile can set alternate desired temperatures. Still further, the desired temperature may be different for each different situation. For example, climate control system 200 can also take into account the outside ambient temperature. If the outside ambient temperature is very high (i.e., 90° F.), a pre-set profile may set the desired temperature to be higher than the normal desired temperature (i.e., 80° F. instead of 75° F.) with the benefits of power saving and for the human occupant to have better acclimation between indoor and outdoor temperature. Alternatively, the pre-set profile may set the desired temperature to be lower than the normal desired temperature (i.e., 70° F. instead of 75° F.) for the benefits of a larger perceived difference temperature between outdoor and indoor.

In another example, a set of vehicle climate control parameters or settings is based on historical climate control parameters or settings of a selected occupant indexed to contextual information, such as an outside weather condition (e.g., temperature). The contextual information sensed by the various sensors 210a-n is compared to predetermined contextual information in each of the plurality of pre-set profiles 241a-n.

When a match, or closest or acceptable match is determined, the corresponding vehicle climate control parameters or settings are selected and either implemented automatically or recommended to an occupant for implementation. The pre-set selection process can be performed at a specific point during vehicle operation or continuously or semi-continuously during vehicle operation.

In another example, the automatically selected or occupant-recommended set of vehicle climate control parameters or settings is a function of plural sensed exterior climate parameters, such as temperature, (relative or absolute) humidity, air (or barometric) pressure, wind speed, wind direction, rainfall amount, rainfall intensity, solar flux density, total solar flux, dew point temperature, wet bulb temperature, heat index, wind run, wind gust, and evapotranspiration. Simple or complex algorithms select a preferred set of climate control parameters or settings for automatic implementation or recommendation to the occupant. A simple algorithm, for instance, would index interior and exterior temperature readings to a selected climate control temperature, an exterior air pressure to a selected climate control pressure, an exterior humidity to a selected climate control temperature, and a solar flux density and/or total solar flux to a selected climate control UV level or degree. More complex algorithms could relate multiple different types of sensed climate control information to each selected climate control parameter or setting. For example, a comfortable climate control temperature could be a function not only of current and/or external temperature but also one or more of (relative or absolute) humidity, wind speed, wind direction, rainfall amount, rainfall intensity, solar flux density, total solar flux, dew point temperature, wet bulb temperature, heat index, wind run, wind gust, and evapotranspiration.

In another example, a set of vehicle climate control parameters or settings is a function of a sensed spatial location of a vehicle, such as determined by a satellite positioning system receiver. As will be appreciated, the climate exterior to the vehicle and therefore the interior climate of a vehicle are related to the sensed vehicle location. A vehicle in a type of climate (e.g., alpine or highland, desert or dry, mild mid-latitude, severe mid-latitude, and polar) or region (e.g., county, state, and the like) generally experiences a defined, predictable weather profile during the course of a day, month or year. The spatial location may also be used to obtain a current or forecasted set of weather conditions (e.g., air pressure, temperature, (relative or absolute) humidity, air (or barometric) pressure, wind speed, wind direction, rainfall amount, rainfall intensity, solar flux density, total solar flux, dew point temperature, wet bulb temperature, heat index, wind run, wind gust, and evapotranspiration) for the vehicle's location. These conditions can be used as described above to determine recommended or automatically selected climate control parameters and settings.

In another example, a set of vehicle climate control parameters or settings is a function of a sensed time, such as a day or month (e.g., a seasonal time of year) or time of day (e.g., day or night, early morning, mid-morning, late morning, noon, early afternoon, mid-afternoon, late afternoon, evening, nighttime, and the like). As will be appreciated, the climate exterior to the vehicle and therefore the interior climate of a vehicle are related to the sensed time.

In another example, an automatically selected or recommended set of vehicle climate control parameters or settings is a function of a historical set of sensed parameters. For example, if an occupant previously selected a set of vehicle climate control parameters or settings when a first set of sensed parameters existed and a second set of sensed parameters is currently sensed that is similar to the first set of sensed parameters, the previously selected set of vehicle climate control parameters or settings may be currently selected automatically or recommended to the occupant.

In another example, an automatically selected or recommended set of vehicle climate control parameters or settings is a function of respective sets of vehicle climate control parameters or settings determined, based on plural of the above factors, for a selected occupant of the vehicle.

In another aspect, an automatically selected or recommended set of vehicle climate control parameters or settings is a function of respective sets of vehicle climate control parameters or settings determined, based on one or more of the above factors, for each of multiple occupants of the vehicle. The selection can be based on any suitable mathematical algorithm, such as by selecting a weighted or unweighted average, median, or mode of multiple values for a selected climate control parameter. For instance, if three different climate control temperatures correspond to three vehicle occupants, the vehicle climate control system can select a weighted or unweighted average, median, or mode of the temperatures as the climate control temperature parameter setting for the entire vehicle passenger compartment. This applies to vehicle climate control parameters and settings that impact all vehicle occupants equally and are not separately and independently controllable for each occupant. Other vehicle climate control parameters or settings, such as seat or steering wheel temperature can be controlled separately and independently for each occupant and would not be combined.

In another example, a set of vehicle climate control parameters or settings is selected remotely through the Internet. The vehicle is assigned a unique Internet Protocol ("IP") address, such as an IP address defined by Internet Protocol version 6 ("IPv6"). For example, the vehicle user can select the set of vehicle climate control parameters or settings while in an office or at home in response to current weather condition(s) or forecasted weather condition(s).

In another example, climate control parameters or settings selected by occupants of other proximally located vehicles are used to determine climate control parameters and settings for a selected vehicle. As an Internet node, the selected vehicle, whether or not currently activated or in operation, can communicate with other vehicles, also configured as Internet nodes, and collect selected information, such as currently selected climate control parameters and settings and current SPS location. Such collected climate control parameters and settings can be used to select automatically or recommend to the user of the selected occupant climate control parameters and settings to be implemented in the selected vehicle. The climate control parameters and settings for the current vehicle can be generated using any suitable algorithm, such as a (weighted or unweighted) mean (with a parameter or setting being weighted by a relative distance of the respective vehicle to the selected vehicle with closer vehicles being given a higher weighting factor than more remotely located vehicles), mean, median, and/or mode.

Figure 5:
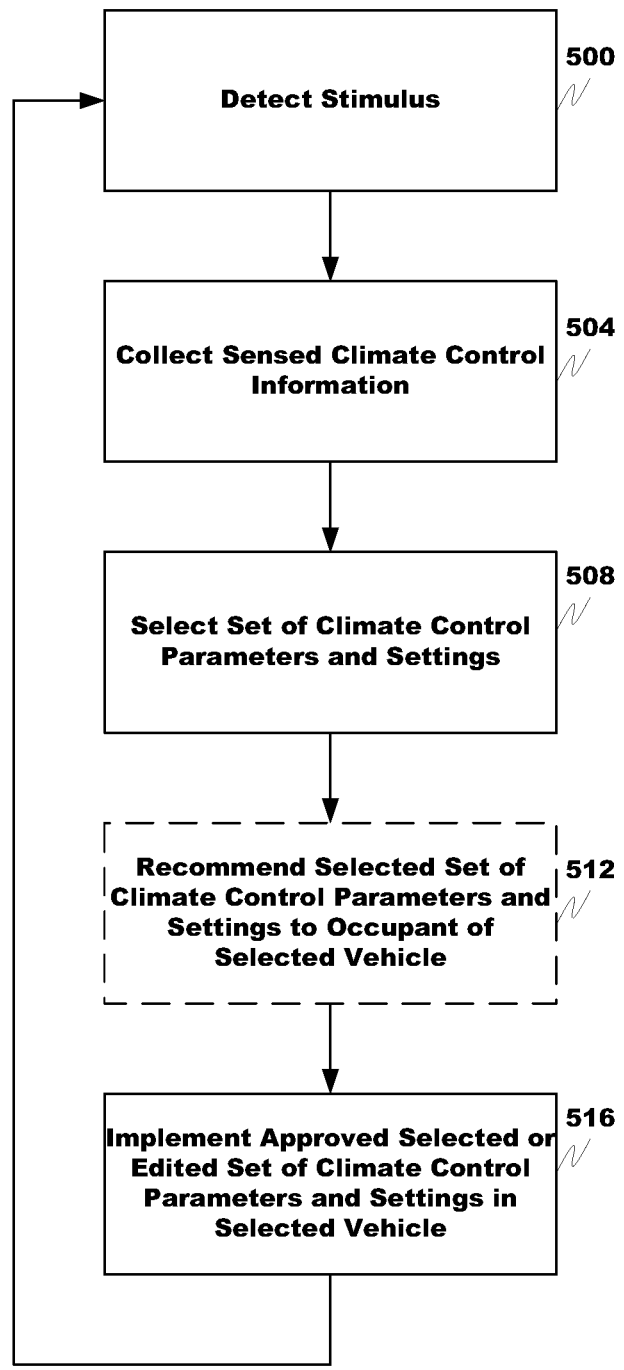
FIG. 5 illustrates a logic flow diagram according to an embodiment.

A high level algorithm employable by climate control system 200 will now be described with reference to FIG. 5.

In step 500, climate control system 200 detects a stimulus. Exemplary stimuli include user or vehicle activation, a predetermined level of change in sensed climate control information, passage of time since last execution, and the like.

In response, climate control system 200, in step 504, collects sensed climate control information from the various sensors 210*a-n*, from other proximally located vehicles, from the SPS receiver, and/or from memory 240.

Based on the collected sensed climate control information and applying a suitable algorithm, climate control system 200, in step 508, selects a set of climate control parameters and settings for the selected vehicle.

In optional step 512, the selected set of climate control parameters and settings is presented to an occupant, such as by a user interface. The occupant can approve, disapprove, or edit for approval the proposed or recommended set of climate control parameters and settings.

In step 516, climate control system 200, if approved, implements the selected or edited set of climate control parameters and settings in the selected vehicle. When the set of climate control parameters and settings is not approved, the climate control system 200 does nothing further.

Figure 3:
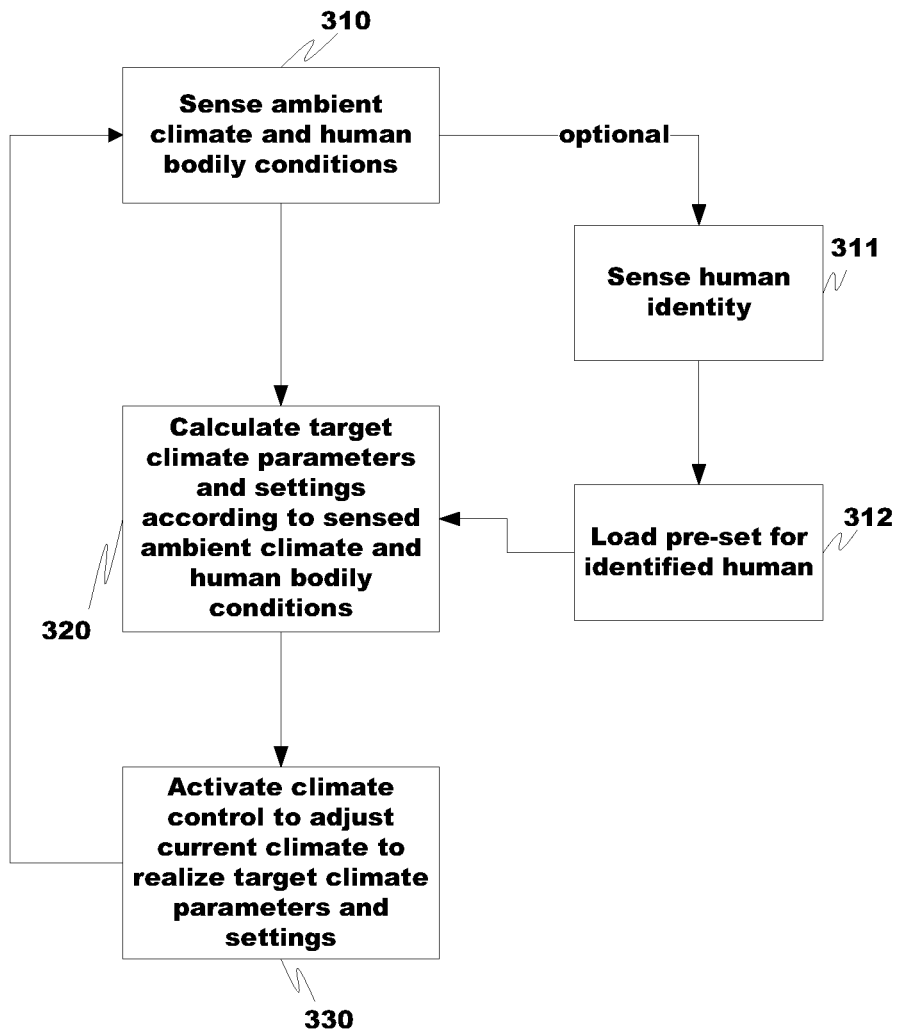
FIG. 3 illustrates a logic flow diagram for a climate control system according to an embodiment of the disclosure.

A climate temperature control algorithm 300 employable by climate control system 200 will now be described with reference to FIG. 3.

Algorithm 300 commonly begins to execute after being activated by an external command (i.e., climate control system 200 being turned on by a switch or an automatic timer, or turning on the engine of a vehicle) or other detected stimulus. Algorithm 300 may also be on continuously as explained below.

In step 310, climate control system 200 senses the ambient climate and the human bodily conditions of the human occupants. In a preferred embodiment, the sensing in step 310 is performed by at least some of sensors 210*a-n*. Sensors 210*a-n* include various sensors including temperature sensors that sense the ambient or localized temperature inside the environment where climate control system 200 is placed. Further, other sensors may also sense the outdoor temperature outside of the indoor environment. Data gathered by the sensors are transmitted by wired or wireless means to processor 230 for processing.

Optionally, in step 311, climate control system 200 further senses the identities of the human occupants. In a preferred embodiment, the sensing in step 311 is performed by at least some of sensors 210*a-n*. Sensors 210*a-n* may include various biometric and/or identity sensors that are operable to sense the identity of a human occupant. Identity sensors may include fingerprint sensors, voice recognition devices, retina scanners, and/or other devices. Biometric sensors may similarly sense bodily conditions such as heart rate, body temperature and/or brainwave patterns. Collected data from these sensors are transmitted to processor 230 via wired or wireless means. A user may also manually identify his or her identity to climate control system 200 via user interface 250 as discussed.

Also optionally, in step 312, climate control system 200 loads a pre-set for the human occupant identified in step 311. In a preferred embodiment, pre-sets are stored in memory 241. These pre-sets store climate profiles for a particular user. Preferably, each user that is expected to use climate control system 200 frequently may have one or more pre-sets stored in memory 240. Further, various default and/or generic profiles may also be stored as pre-sets that are accessible by any users.

In some situations, multiple pre-sets may conflict. For example, a user may have multiple pre-sets (i.e., a pre-set may store a user's desired temperature as 75° F. generally; another pre-set may store the same user's desired temperature as 70° F. when the body temperature is over 80° F.). Therefore, step 312 may include a conflict resolution sub-step that resolves choosing one pre-set when the user has multiple pre-sets. In one configuration, each pre-set may include a priority value such that one pre-set takes precedent over another. In another configuration, a pre-set that is the least generic may have the highest priority (i.e., a pre-set that considers two parameters may take precedent over one parameter, a pre-set that considers a more specific parameter, such as body temperature, may take precedent over a more generic parameter, such as ambient temperature). A user may also manually choose a pre-set via user interface 250.

In an exemplary embodiment of step 312, a human occupant is identified in step 311. If the human occupant is a regular user with existing pre-sets in memory 240, a pre-set will load according to the conflicts resolution sub-step as discussed. If the particular human occupant does not have any associated pre-set, a generic pre-set may be loaded. The user may also manually load a generic pre-set through user interface 250.

In step 320, climate control system 200 calculates the target climate according to the sensed ambient climate and the human bodily conditions in step 310. Further, if a particular pre-set has been loaded in step 312, the target climate is also calculated according to the loaded pre-set. Climate and human bodily conditions data sensed in step 310 are used as input data. The ruleset for calculating the target climate can be loaded from the chosen pre-set or from the operating code in memory 240.

In an exemplary embodiment of step 320, reading from sensors 210*a-n* are considered with respect to the loaded ruleset. It should be recognized that the ruleset calculates the target climate at a systems level. For example, one ruleset sets the target temperature as 75° F. when the ambient temperature is under/over 70° F./80° F. However, the input data are collected at the device level for each individual sensor (i.e., data is taken to represent the temperature at a localized location of the sensor). Thus, to analyze the data, processor 230 considers the chosen ruleset and assigns a weight value to each input data representing the importance of that reading. For example, if the ruleset considers the ambient temperature (i.e., set target temperature as 75° F. when the ambient temperature is under/over 70° F./80° F.), each input data may be given equal weight to represent that the ambient temperature may be the average of the input data. In another configuration, the physical location of each sensor may be considered in the calculation. If a group of sensors are close to each other, these sensors may be given less weight in contrast to a lone sensor covering a large area of the environment. In another example, if the ruleset considers the human body temperature, the data from the sensor localized for the human occupant is given the most weight. Once processor 230 has aggregated the collective reading value in view of the chosen ruleset, a target climate for the environment is calculated according to the ruleset.

In step 330, climate control system 200 activates the climate control 220 to achieve the calculated target climate in step 320. Climate control 220 will be activated to change the climate conditions closer to the target climate if there is a difference between the two. For example, if the target temperature is lower than the present temperature, the cooling system of climate control 220 is activated. If the target humidity is higher than the present humidity, the humidifier of climate control 220 is activated. In some embodiments of the disclosure, there may be separate climate controls in the same indoor environment (i.e., there is a separate climate control for each human occupant in a vehicle at different seats). Here, multiple algorithms 300 can operate either independently or with some shared interaction (i.e., shared input from sensors 210*a-n*) for each climate control 220.

Climate control system 200 effectively forms a feedback loop from step 330 to step 310. Climate control 220 affects the climate and human bodily conditions as it is activated in step 330. Sensors 210a-n actively sense the present climate and human bodily conditions in step 310 as they are changed by climate control 220. Therefore, the continuous operation of algorithm 300 collects and evaluates the climate and human bodily conditions of the environment as they are being affected by climate control system 200. In some embodiments of the disclosure, algorithm 300 is repeated at delayed time intervals. For example, after step 330 completes, algorithm 300 does not start step 310 again until after a certain time (i.e., 15 minutes). As climate control 220 is expected to cause changes to the climate of the environment gradually, and as the human occupants perceive climate changes gradually, a delayed time interval for repeating algorithm 300 should cause at the most only minor perceivable difference to climate control system 200 than actually running algorithm 300 continuously.

Figure 4:
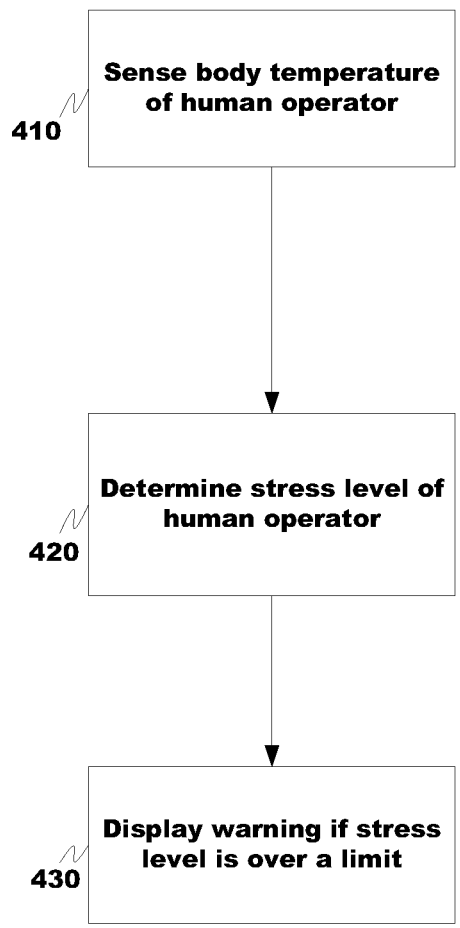
FIG. 4 illustrates a logic flow diagram for a stress level detection system using temperature sensors in a vehicle according to an embodiment of the disclosure.

Another climate temperature control algorithm 400 employable by vehicle 100 for detecting the stress level of a human operator will now be described with reference to FIG. 4.

In step 410, temperature sensors located in the passenger compartment of vehicle 100 senses the body temperature of a human operator. In a preferred embodiment of the disclosure, step 410 is performed by the one or more temperature sensors located in the vicinity of seat 140 for the operator of the vehicle, in order to capture the accurate body temperature of the human operator. In another embodiment, temperature sensors are carried on the body of the human operator. The data collected is transmitted by wired or wireless means to general purpose computing unit 132 for further processing.

In step 420, general purpose computing unit 132 determines the stress level of the human operator based on the received data from the temperature sensors. In one embodiment of the disclosure, the determination is performed by correlating a change in the sensed temperature data as a change in the stress level of the human operator. For example, a rising body temperature over the course of an hour of driving may indicate a rising stress level. In other embodiments, specific algorithm and correlation formula may be used for the determination. Further, as discussed above, sensors that read heart rate, sweat, or other biometric readings may also be used in conjunction with or in place of temperature sensors for step 420.

In one embodiment of the disclosure, general purpose computing unit 132 may determine the stress level of the human operator with respect to a health profile of the human operator. Health profile may contain information with respect to the stress tolerance, correlation of body temperature and stress level, and other health issues related to stress specific to the human operator. Health profiles of multiple regular human operators for vehicle 100 are stored for loading in general purpose computing unit 132 (i.e., in a memory coupled to the general purpose computing unit). In some configurations, health profiles may be programmed into general purpose computing unit 132 via a user interface. In other configurations, health profiles are measured at a third location outside the vehicle (i.e., at a health facility) and stored in a computer-readable medium (i.e., magnetic cards, flash drives, sensors carried by the person). These health profiles can be loaded into general purpose computing unit 132 by wired or wireless means and/or through ports coupled to general purpose computing unit 132 (i.e., USB port).

In one embodiment, the health profile may be included as part of a pre-set profile in pre-sets 241a-n for climate control system 200. Here, stress level detection can be integrated into climate control system 200 for vehicle 100. Sensors 210a-n that are used for sensing the body temperature in step 310 can also be used for stress level detection. Further, step 420 can be integrated with step 312 when loading a pre-set for a target climate profile that includes a health profile for stress detection. For example, if rising body temperature is detected, general purpose computing unit 132 may determine that the human operator's stress tolerance has been reached in step 420. Further, general purpose computing unit 132 may determine that climate control can help alleviate some stress. Therefore, processor 230, which is preferably part of general purpose computing unit 132, may give priority to and load a pre-set profile that gives consideration to the stress level. Processor 230, in step 320, may calculate a target climate that helps alleviate stress for the human operator.

In step 430, general purpose computing unit 132 displays a warning if the stress level of the human operator is over a certain limit. In various embodiments, the warning can be displayed visually at the dashboard 110, at general purpose computing unit 132, or at another display in the central console 130. The warning can also be sonically announced as an alarm or vocal notification or via other perceptible means and/or a combination of means.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In some embodiments, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, (e.g., for improving performance, achieving ease and\or reducing cost of implementation).

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure (e.g., as may be within the skill and knowledge of those in the art), after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A vehicle, comprising:
a climate control system operable to control a climate in an interior of a selected vehicle, the climate control system comprising:
a tangible and non-transient computer readable memory comprising climate control logic; and
a microprocessor to execute the logic, the climate control logic performing the following operations when executed by the microprocessor:
sense climate control information, in lieu of or in addition to an interior temperature of the selected vehicle, to select a set of vehicle climate control parameters and/or settings for the selected vehicle interior, wherein the sensed climate control information comprises a set of vehicle climate control parameters and/or settings selected for a different nearby second vehicle, in temporal proximity to a time of selection of the vehicle climate control parameters and/or settings for the selected vehicle; and
control, in accordance with the selected set of vehicle climate control parameters and/or settings, an operation of the climate control system of the selected vehicle, wherein the climate control parameters and/or settings are determined remotely from the selected vehicle and provided to the selected vehicle by the Internet, wherein the sensed climate control information received from each of multiple vehicles comprising the second vehicle is treated differently based on a distance of each of the multiple vehicles from the selected vehicle, and wherein each of the multiple vehicles is at a different distance from the selected vehicle.

2. A method, comprising:
collecting, by a microprocessor, sensed climate control information, wherein the sensed climate control information comprises at least one of the following:
(i) a sensed body condition and/or characteristic of a selected occupant of the selected vehicle;
(ii) a sensed identity of the selected occupant;
(iii) sensed exterior climate information respecting an exterior climate of the selected vehicle;
(iv) sensed interior climate information respecting an interior climate of the selected vehicle; and
(v) a set of vehicle climate control parameters and/or settings selected by a different occupant of a different second vehicle; and
controlling, by the microprocessor and in accordance with the selected sensed climate control information, an operation of a climate control system of the selected vehicle to produce a selected set of vehicle climate control parameters and/or settings for the selected vehicle interior, wherein
multiple items of different ones of sensed climate control information (i) through (v) are collected, wherein each item of sensed climate control information is assigned a different weight value used in selecting the selected set of vehicle climate control parameters and/or settings and wherein the multiple items of different ones of sensed climate control information (i) through (v) have differing weight values.

3. The method of claim 2, wherein the sensed climate control information comprises at least (i) and wherein the sensed body condition and/or characteristic is one or more of body temperature, a stress level, heart rate, pulse rate, a body movement, an emotional state, a blood alcohol content, a blood oxygen content, and a degree of mental alertness.

4. The method of claim 2, wherein the sensed climate control information comprises at least (ii) and wherein a plurality of pre-set climate control profiles stored in a memory of the selected vehicle correspond to a plurality of potential occupants of the selected vehicle.

5. The method of claim 2, wherein the sensed climate control information comprises at least (iii) and wherein the sensed climate control information comprises one or more of a temperature, (relative or absolute) humidity, air (or barometric) pressure, wind speed, wind direction, rainfall amount, rainfall intensity, solar flux density, total solar flux, dew point temperature, wet bulb temperature, heat index, wind run, wind gust, and evapotranspiration of the exterior climate.

6. The method of claim 2, wherein the sensed climate control information comprises at least (iv) and wherein the sensed climate control information comprises one or more of a temperature, (relative or absolute) humidity, air (or barometric) pressure, wind speed, wind direction, rainfall amount, rainfall intensity, solar flux density, total solar flux, dew point temperature, wet bulb temperature, heat index, wind run, wind gust, and evapotranspiration of the interior climate.

7. The method of claim 2, wherein the sensed climate control information comprises a sensed spatial location of the selected vehicle and wherein the sensed spatial location of the selected vehicle is received from a satellite positioning system.

8. The method of claim 2, wherein the sensed climate control information comprises a sensed time and wherein the sensed time is a time-of-day, day-of-month, and/or month-of-year.

9. The method of claim 2, wherein the sensed climate control information comprises a historical set of sensed parameters and wherein the historical set of sensed parameters is related to a set of vehicle climate control parameters and/or settings selected by the occupant in response to the historical set of sensed parameters.

10. The method of claim 2, wherein multiple and conflicting sets of predetermined parameters and/or settings apply based on different ones of the sensed climate control information (i) through (v), wherein the microprocessor applies conflict resolution rules to select one of the sets of predetermined parameters and/or settings to apply in the controlling step, wherein each of the multiple and conflicting sets of predetermined parameters and/or settings has a priority value, and wherein the priority value is used by the conflict resolution rules to select one of the sets of predetermined parameters and/or settings to apply in the controlling step.

11. The method of claim 10, wherein the vehicle operator remotely selects, by the remote communication device, a set of vehicle climate control parameters and/or settings while in an office or at home in response to current weather condition(s) or forecasted weather condition(s).

12. The method of claim 10, wherein each of the multiple and conflicting sets of predetermined parameters and/or settings has a relative ranking and wherein the relative ranking is used by the conflict resolution rules to select one of the sets of predetermined parameters and/or settings to apply in the controlling step.

13. The method of claim 2, wherein the weight value represents a level of importance of the corresponding item.

14. The method of claim 2, wherein the weight value is a function of a type of sensor sensing the corresponding item, a location of the corresponding sensor relative to a location of a vehicle occupant, and a relative location of the corresponding sensor relative to locations of other sensors sensing other items of climate control information.

15. The method of claim 2, wherein the vehicle has an Internet Protocol address on an Internet that provides an interface identity and location address that enable the vehicle to directly receive and send Internet communications from a remote communication device of an operator of the vehicle, wherein the vehicle receives the selected set of vehicle climate control parameters and/or settings from the vehicle operator's remote communication device via the Internet by way of communications addressed to the Internet Protocol address of the vehicle, wherein the vehicle is assigned a unique Internet Protocol address, wherein the sensed climate control information comprises (ii), wherein the sensed climate control information is provided and/or selected remotely through the Internet, and wherein the vehicle is assigned a unique Internet Protocol version 6 address.

16. The method of claim 2, wherein the climate control operation includes at least one of temperature, humidity, atmospheric pressure, and air movement, wherein the climate control operation includes at least one of heating, ventilation, and air conditioning, and wherein a separate set of climate control parameters and/or settings are determined for each current occupant of the selected vehicle and a consolidated set of climate control parameters and/or settings are applied in the controlling step.

17. The method of claim 2, wherein the climate control parameters and/or settings are determined remotely from the selected vehicle by a prospective occupant of the vehicle and provided to the selected vehicle by the Internet.

18. The method of claim 2, wherein the sensed climate control information comprises at least (v).

19. A non-transitory and tangible computer readable medium comprising microprocessor executable instructions operable, when executed, to perform the steps of claim 2.

20. A vehicle, comprising:
a climate control system operable to control a climate in an interior of a selected vehicle, the climate control system comprising:
a tangible and non-transient computer readable memory comprising climate control logic; and
a microprocessor to execute the logic, the climate control logic performing the following operations when executed by the microprocessor:
sense climate control information, in lieu of or in addition to an interior temperature of the selected vehicle, to select a set of vehicle climate control parameters and/or settings for the selected vehicle interior, wherein the sensed climate control information comprises a set of vehicle climate control parameters and/or settings selected for a different nearby second vehicle, in temporal proximity to a time of selection of the vehicle climate control parameters and/or settings for the selected vehicle; and
control, in accordance with the selected set of vehicle climate control parameters and/or settings, an operation of the climate control system of the selected vehicle, wherein the sensed climate control information received from each of multiple vehicles comprising the second vehicle is treated differently based on a distance of each of the multiple vehicles from the selected vehicle, and wherein each of the multiple vehicles is at a different distance from the selected vehicle.

21. A vehicle, comprising:
a climate control system operable to control a climate in an interior of a selected vehicle, the climate control system comprising:
a tangible and non-transient computer readable memory comprising climate control logic; and
a microprocessor to execute the logic, the climate control logic performing the following operations when executed by the microprocessor:
collect sensed climate control information, wherein the sensed climate control information comprises at least one of the following:
(i) a sensed body condition and/or characteristic of a selected occupant of the selected vehicle;
(ii) a sensed identity of the selected occupant;
(iii) sensed exterior climate information respecting an exterior climate of the selected vehicle;
(iv) sensed interior climate information respecting an interior climate of the selected vehicle; and
(v) a set of vehicle climate control parameters and/or settings selected by a different occupant of a different second vehicle; and
control, in accordance with the selected sensed climate control information, an operation of a climate control system of the selected vehicle to produce a selected set of vehicle climate control parameters and/or settings for the selected vehicle interior, wherein
multiple items of different ones of sensed climate control information (i) through (v) are collected, wherein each item of sensed climate control information is assigned a different weight value used in selecting the selected set of vehicle climate control parameters and/or settings and wherein the multiple items of different ones of sensed climate control information (i) through (v) have differing weight values.

22. The vehicle of claim 21, wherein the sensed climate control information comprises at least (i) and wherein the sensed body condition and/or characteristic is one or more of body temperature, a stress level, heart rate, pulse rate, a body movement, an emotional state, a blood alcohol content, a blood oxygen content, and a degree of mental alertness.

23. The vehicle of claim 21, wherein the sensed climate control information comprises at least (ii) and wherein a plurality of pre-set climate control profiles stored in a memory of the selected vehicle correspond to a plurality of potential occupants of the selected vehicle.

24. The vehicle of claim 21, wherein the sensed climate control information comprises at least (iii) and wherein the sensed climate control information comprises one or more of a temperature, (relative or absolute) humidity, air (or barometric) pressure, wind speed, wind direction, rainfall amount, rainfall intensity, solar flux density, total solar flux, dew point temperature, wet bulb temperature, heat index, wind run, wind gust, and evapotranspiration of the exterior climate.

25. The vehicle of claim 21, wherein the sensed climate control information comprises at least (iv) and wherein the sensed climate control information comprises one or more of a temperature, (relative or absolute) humidity, air (or barometric) pressure, wind speed, wind direction, rainfall amount, rainfall intensity, solar flux density, total solar flux, dew point temperature, wet bulb temperature, heat index, wind run, wind gust, and evapotranspiration of the interior climate.

26. The vehicle of claim 21, wherein the sensed climate control information comprises a sensed spatial location of the selected vehicle and wherein the sensed spatial location of the selected vehicle is received from a satellite positioning system.

27. The vehicle of claim 21, wherein the sensed climate control information comprises a sensed time and wherein the sensed time is a time-of-day, day-of-month, and/or month-of-year.

28. The vehicle of claim 21, wherein the sensed climate control information comprises a historical set of sensed parameters and wherein the historical set of sensed parameters is related to a set of vehicle climate control parameters and/or settings selected by the occupant in response to the historical set of sensed parameters.

29. The vehicle of claim 21, wherein multiple and conflicting sets of predetermined parameters and/or settings apply based on different ones of the sensed climate control information (i) through (v), wherein the microprocessor applies conflict resolution rules to select one of the sets of predetermined parameters and/or settings to apply in the controlling operation, wherein each of the multiple and conflicting sets of predetermined parameters and/or settings has a priority value, and wherein the priority value is used by the conflict resolution rules to select one of the sets of predetermined parameters and/or settings to apply in the controlling operation.

30. The vehicle of claim 21, wherein each of the multiple and conflicting sets of predetermined parameters and/or settings has a priority value and wherein the priority value is used by the conflict resolution rules to select one of the sets of predetermined parameters and/or settings to apply in the controlling operation.

31. The vehicle of claim 29, wherein the vehicle has an Internet Protocol address on an Internet that provides an interface identity and location address that enable the vehicle to directly receive and send Internet communications from a remote communication device of an operator of the vehicle, wherein the vehicle receives the selected set of vehicle climate control parameters and/or settings from the vehicle operator's remote communication device via the Internet by way of communications addressed to the Internet Protocol address of the vehicle, wherein the vehicle is assigned a unique Internet Protocol address, and wherein the vehicle operator remotely selects, by the remote communication device, a set of vehicle climate control parameters and/or settings while in an office or at home in response to current weather condition(s) or forecasted weather condition(s).

32. The vehicle of claim 21, wherein the weight value represents a level of importance of the corresponding item.

33. The vehicle of claim 21, wherein the weight value is a function of a type of sensor sensing the corresponding item, a location of the corresponding sensor relative to a location of a vehicle occupant, and a relative location of the corresponding sensor relative to locations of other sensors sensing other items of climate control information.

34. The vehicle of claim 21, wherein the sensed climate control information comprises (ii), wherein the sensed climate control information is provided and/or selected remotely through the Internet, and wherein the vehicle is assigned a unique Internet Protocol version 6 address.

35. The vehicle of claim 21 wherein the climate control operation includes at least one of temperature, humidity, atmospheric pressure, and air movement, wherein the climate control operation includes at least one of heating, ventilation, and air conditioning, and wherein a separate set of climate control parameters and/or settings are determined for each current occupant of the selected vehicle and a consolidated set of climate control parameters and/or settings are applied in the controlling operation.

36. The vehicle of claim 21, wherein the climate control parameters and/or settings are determined remotely from the selected vehicle by a prospective occupant of the vehicle and provided to the selected vehicle by the Internet.

37. The vehicle of claim 21, wherein the sensed climate control information comprises at least (v).

38. A vehicle, comprising:
   a climate control system operable to control a climate in an interior of a selected vehicle, the climate control system comprising:
   a tangible and non-transient computer readable memory comprising climate control logic; and
   a microprocessor to execute the logic, the climate control logic performing the following operations when executed by the microprocessor:
      collects sensed climate control information, wherein the sensed climate control information comprises a set of vehicle climate control parameters and/or settings selected by a different occupant of a different second vehicle; and
      controls, in accordance with the selected sensed climate control information, an operation of a climate control system of the selected vehicle to produce a selected set of vehicle climate control parameters and/or settings for the selected vehicle interior.

39. The vehicle of claim 38, wherein multiple and conflicting sets of predetermined parameters and/or settings apply based on the sensed climate control information and wherein the microprocessor applies conflict resolution rules to select one of the sets of predetermined parameters and/or settings to apply in the controlling operation.

40. The vehicle of claim 38, wherein multiple items of sensed climate control information are collected and wherein each item of sensed climate control information is assigned a different weight value used in selecting the selected set of vehicle climate control parameters and/or settings.

41. The vehicle of claim 38, wherein the vehicle has an Internet Protocol address on an Internet that provides an interface identity and location address that enable the vehicle to directly receive and send Internet communications from a remote communication device of an operator of the vehicle and wherein the vehicle receives the selected set of vehicle climate control parameters and/or settings from the vehicle operator's remote communication device via the Internet by way of communications addressed to the Internet Protocol address of the vehicle.

42. A method for performing, by the microprocessor, the collection and control operations of claim 38.

43. The tangible and non-transient computer readable memory of claim 38, wherein the climate control logic comprises microprocessor executable instructions that, when executed, perform the operations of claim 38.

* * * * *